United States Patent Office 3,503,933
Patented Mar. 31, 1970

3,503,933
LOW MELTING POLYURETHANE UREA AND METHOD FOR MANUFACTURE
Samuel Kaizerman, New Brunswick, Eugene Yue Chieh Chang, Bridgewater Township, Somerset County, and John Henry Butler, Piscataway, N.J., assignors to American Cyanamid Company, Stamford, Conn., a corporation of Maine
No Drawing. Filed Aug. 16, 1966, Ser. No. 572,693
Int. Cl. C08g 22/02, 22/18
U.S. Cl. 260—75    9 Claims

ABSTRACT OF THE DISCLOSURE

An essentially linear thermoplastic polyurethaneurea having a melt-flow temperature in the range of 100–180° C. and being capable of repeated shaping, comprising a plurality of

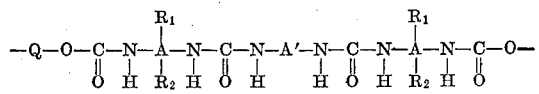

units, said polyurethane-urea being produced by reacting an amine of which at least 90% is a diamine of the formula

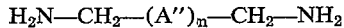

$$H_2N-CH_2-(A'')_m-CH_2-NH_2$$

with an isocyanate-terminated prepolymer containing les than about 1% free diisocyanate, produced by reacting a hydroxyl-terminated polyester or polyether of molecular weight of about 500 to about 5,000 and having the formula

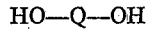

HO—Q—OH with an isocyanate of which at least 90% is a diisocyanate of the structure

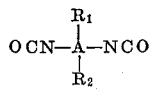

wherein the reactivity of one isocyanate group toward the hydroxyl group of said polyester or polyether is at least five times the reactivity of the other isocyanate group, the amount of said diamine being from about 1.005 to about 1.1 equivalents per equivalent of isocyanate, wherein:

Q is the residue on removal of the terminal hydroxyl groups from said polyester or polyether;
A is an aromatic ring;
$R_1$ and $R_2$ are hydrogen, alkyl of 1–6 carbon atoms, chloro or methoxy, provided at least one of $R_1$ and $R_2$ is other than hydrogen; and
A' is —$CH_2$—(A'')$_n$—$CH_2$—
 where A'' is alkylene of up to about 10 carbon atoms or a monocarbocyclic ring and $n$ is 0 or 1.

This invention relates to thermoplastic compositions and to a process for their manufacture. More particularly, it relates to thermoplastic polyurethane-urea compositions of an essentially linear polymeric structure comprising a plurality of structural units of the formula:

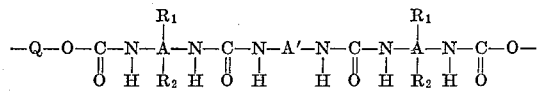

wherein Q represents the residue on removal of the terminal hydroxyl groups from a hydroxyl-terminated polyester or polyether; A is an aromatic ring and $R_1$ and $R_2$ are hydrogen, alkyl ($C_1$–$C_6$), chloro, or methoxy, except that at least one of $R_1$ or $R_2$ is alkyl, chloro, or methoxyl, and wherein the isocyanate groups originally placed on the aromatic ring are such that the one is at least five times the reactivity of the other toward the polyester and/or polyether hydroxyl group under the conditions used in carrying out the reaction; A' is a divalent organic radical in which at least the terminal members are aliphatic: and to a method for manufacture of said compositions.

The problem of obtaining shapable thermoplastic polymers having the desirable properties of rubbery elastomers has long been recognized, but only very limited success has been achieved in effecting a solution to the problem. Certain polymer types were suggested or employed as thermoplastic rubbery polymers capable of repeated shaping. However, these polymers are unsuitable for one or more of several reasons including poor properties of the shaped article, limited thermoplasticity (i.e. limited number of times it could be reshaped), high melting point, excessive decomposition when shaped at the softening point, high cost, and the like. What is needed to solve the particular problem is a polymer which is thermoplastic, melts or softens at a sufficiently low temperature to permit shaping without significant decomposition, produces the desired physical properties in the shaped article, can be reshaped a number of times without ill effect, is low in cost, and the like. While it is generally agreed that the polymer type that has the greatest potential for filling this need is the polyurethane-urea type, the specific polymer needed for producing the desired thermoplastic material having the desirable properties of rubbery elastomers has not been known up to the present time. Although certain polyurethane-urea polymers are useful for the preparation of rubbery fibers, these polymers are not suitable for use as thermoplastics of more general utility.

There exists the need, therefore, for polymers which are thermoplastic materials having the desirable properties of rubbery elastomers and which have a melting point sufficiently low as to be moldable or extrudable without appreciable decomposition, can be reshaped many times without ill effect, are low in cost, and otherwise overcome the deficiencies of the former polymers.

It has now been discovered that polymers containing the recurring chain shown in the structure (I) above are desirable thermoplastic materials having the desirable properties of rubbery elastomers provided certain restrictions are met. The polymers must have melting or softening points below about 180° C. so that they can be molded or extruded without appreciable decomposition. To achieve this effect while still maintaining the desirable properties in the shaped article, it is necessary that the number of polyurethaneurea linkages in the polymer chain be small relative to the number of polyester linkages therein. It is also necessary that the polyurethane-urea linkages occur at well spaced intervals within the polymer structure and that the occurrence of adjacent or closely spaced polyurethane-urea linkages be avoided. Thus, in order for the polymer to produce desirable properties in the shaped article it is necessary that it contain polyurethane-urea linkages, but in order for it to be widely useful as a thermoplastic the distribution of these linkages must be of a specific design. To achieve this reuslt in view of the highly complex nature of the polymer is highly unexpected. The reuslt is also surprising in view of the fact that only certain combinations of reactants are capable of producing the desired polymers.

According to the present invention, a polyester or polyether of suitable molecular weight is reacted with a sufficient quantity of a particular diisocyanate followed by reaction of the prepolymer thus formed with a suitable diamine to produce the desired polymer containing polyurethane-urea linkages. Several preparative processes have been discovered to produce the desired polymers, one of which is described herein as a part of the total invention relating to the polymers and the method for making same.

The thermoplastic polyurethane-ureas of the present invention in the form of shaped articles have a variety of uses wherein advantage is taken of their special properties. Such polymers are especially useful because of their rubbery nature and chemical resistance in the fabrication of gears, pump membranes, gaskets, hose, cable coverings, films, elastic threads, and the like.

Polyurethane-urea compositions capable of being converted to elastic thread have been known for some time. The process for conversion of these previously known compositions to elastic threads have been heretofore restricted to the more expensive and complex wet spinning and/or dry spinning techniques. This restriction results from the high melting points of the previously known polyurethane-urea compositions and/or to the close proximity of the melting points to the decomposition temperatures of the polymers.

The thermoplastic polyurethane-ureas of the present invention, by virtue of avoiding a high concentration of adjacent or closely spaced polyurethane-urea linkages, possess a melting point sufficiently low to permit melt spinning at temperatures well below the decomposition temperatures of the polymer. The polyurethane-ureas of the present invention may also be converted to elastic thread by other conventional spinning techniques, as for example, dry or wet spinning, known to those skilled in the art.

As starting materials in preparing the polymers of the present invention are employed various polyesters or polyethers prepared by well-known processes of the art. The particular polyesters or polyethers that may be employed should have a molecular weight in the range of about 500 to about 5000, preferably 600 to 2500. Among the polyesters that may be employed are those obtained by the reaction of acids such as succinic, glutaric, adipic, pimelic, sebacic, etc. with diols such as ethylene glycol, 1,3-propanediol, 1,4-butanediol, 1,6-hexanediol, etc. Particularly good results are obtained with poly(ethylene adipate). Among the polyethers that may be employed are those obtained from polymerization of alkylene oxides such as 1,2-propylene oxide, 1,3-propylene oxide, 1,4-butylene oxide, etc. as well as mixtures thereof. Particularly good results are obtained using a polyether based on 1,4-butylene oxide.

The polyesters and polyethers described above are hydroxyl terminated. The hydroxyl equivalency of the polyesters or polyethers may be reduced to some extent prior to the reaction with the diisocyanate by initial reaction with monofunctional isocyanate, if desired, in order to control the molecular weight of the final polymer. Alternatively, a monofunctional isocyanate may be substituted for part of the total diisocyanate charge and added with the diisocyanate, if desired, for the same purpose. However employed, the monofunctional isocyanate may be used up to about 10%, based on the hydroxyl equivalency when employed. Among the monofunctional isocyanates that may be employed are included phenyl isocyanate, 2-biphenylene isocyanate, p-tolylene isocyanate, xylene isocyanates, etc. The reaction between polyester or polyether and monofunctional isocyanate when conducted separately may be carried out at 60 to 130° F., preferably 90 to 100° C., in about 1 to 4 hours, preferably 2 to 3 hours.

The polyester or polyether whether or not previously modified as to hydroxyl equivalency is next reacted with a suitable diisocyanate in a manner in which both chain extension and isocyanate termination is effected and in which the resultant polymer has a free residual diisocyanate content of less than about 1%, preferably less than about 0.5%, based on the total polymer. This effect is accomplished by using as the diisocyanate in the above reaction, a compound of the structure:

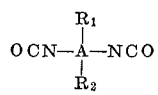

wherein A is an aromatic ring and $R_1$ and $R_2$ are hydrogen, alkyl ($C_1$ to $C_6$), chloro-, or methoxyl, except that at least one of $R_1$ or $R_2$ is alkyl, chloro, or methoxyl, and wherein the isocyanate groups are placed on the aromatic ring such that the reactivity of the one is at least five times the reactivity of the other toward the polyester and/or polyether hydroxyl group under the conditions used in carrying out the reaction.

Depending on the diisocyanate used, the reaction may be carried out under any suitable conditions of temperature and time, provided that chain extension and isocyanate termination result, and provided further that the free residual isocyanate content of the polymer is less than about 1%, preferably less than about 0.5%. When 2,4-tolylene diisocyanate is reacted with poly(ethylene adipate) having a number average molecular weight of about 2000, e.g., satisfactory results are obtained using a ratio of equivalents of diisocyanate groups to hydroxyl groups in the polyester of 1.8 for 24 hours at a temperature of 50° C.

The ratio of equivalents of diisocyanate to free hydroxyl groups in the polyester or polyether may vary from about 1.3 to about 1.9 to 1, preferably 1.4 to 1.8, the reaction may be carried at a temperature ranging from about 30 to about 100° C., preferably 50 to 80° C., for from about 4 to about 48 hours, preferably 8 to 24 hours. Among the suitable diisocyanates that may be employed are included 2,4-tolylene diisocyanate, 1-ethyl-2,4-phenylene diisocyanate, 1-chloro-2,4-phenyl diisocyanate, 1-methoxy-2,4-phenyl diisocyanate as long as they meet the reactivity requirements stated previously.

The isocyanate terminated polyester or polyether obtained above is dissolved in an organic solvent such as tetrahydrofuran, acetonitrile, chloroform, etc. to form a solution of from about 10 to about 35%, preferably 15 to 25%, polymer content. The particular solvent employed is not especially critical, but it is preferred that the solvent employed be unreactive with isocyanate groups and have adequate solvating ability for the prepolymer and coreactants and solvating ability for the final polymer. It is also necessary that the solvent allow thorough mixing of the reactants to be effected before gelation of the reaction mixture occurs.

A separate solution of suitable diamine in the same or other suitable solvent is prepared so as to contain from about 0.25 to 5.0%, preferably 0.5 to 2.5% of diamine. Among the diamines that may be employed are aliphatic compounds of the formula:

$$H_2N-CH_2-(A'')_n-CH_2-NH_2 \qquad (II)$$

wherein $A''$ is selected from the group consisting of alkylene of up to about 10 carbon atoms and monocarbocyclic rings and $n$ is an integer equal to zero or 1. Suitable diamines include ethylene diamine, propylene-1,3-diamine, butylene-1,4-diamine, $\alpha,\alpha'$-p-xylylene diamine, $\alpha,\alpha'$-m-xylylene diamine, isomeric mixtures of the latter two diamines, etc., the last named diamine being preferred. The diamine is employed at an equivalent ratio of from about 1.005 to about 1.1, preferably 1.01 to 1.05, per equivalent of isocyanate. If desired, up to about 10% of the equivalents of diamine may be replaced by monofunctional amine, i.e., a compound containing only one amine group, to control molecular weight of the final polymer. This molecular weight control may be made in addition to or in place of the similar process involving use of monofunctional isocyanate described above. Among the monofunctional amines which may be employed are included diethylamine, di-n-propylamine, di-n-butylamine, benzylamine etc.

The separate solutions of isocyanate-terminated polyester or polyether and diamine are then mixed while stirring with a high-speed, high-shear mixer. After addition is complete stirring is continued for from about 2 to about 15 minutes or longer, preferably 4 to 10 minutes. The gel-like solution obtained is then transferred to a tray or similar device and dried at reduced pressure. After solvent removal the product may then be crumbled and is the desired thermoplastic polyurethane-urea. Among the high-speed, high-shear mixers that may be effectively employed in this process are included Eppenbach mixers, Waring Blendors, etc.

Certain additives in appropriate amounts may be incorporated into the thermoplastic polymers at the appropriate point in the process. Such additives aid in the processing of the final polymer or contribute to its esthetic appeal and include such materials as mold-release agents, conventional fillers, colorants, stabilizers, and the like. Where soluble, such additives may be incorporated into one of the solutions used to form the final polymer as long as they do not affect the desired reaction. Otherwise, they may be incorporated into the final polymer by milling, for example.

The invention is more fully illustrated by the examples which follow.

EXAMPLE 1

To 3750 parts (1.9 moles, 3.8 equivalents) of a hydroxyl-terminated poly(ethylene adipate) of molecular weight 1975 and 1505 parts (2.45 moles, 4.9 equivalents) of a similar compound of molecular weight 615 was added 1360 parts (7.82 moles, 15.64 equivalents) of 2,4-tolylene diisocyanate (equivalent ratio of 1.8 NCO/1.0 OH). The mixture was reacted at 60° C. for 16 hours with stirring and then cooled. The final prepolymer had an isocyanate content of 4.1% and virtually no unreacted diisocyanate, i.e. less than about 0.5%.

40 parts of the above prepolymer were dissolved in 180 parts of acetonitrile. Another solution containing 1.813 parts of butane-1,4-diamine (1.04 equivalent per NCO equivalent) in 225 parts of tetrahydrofuran was prepared. While stirring the amine solution with an Eppenbach mixer, the prepolymer solution was added. After addition was complete, the stirring was continued for an additional 5 minutes. The above mixture was then poured into a glass tray and dried under reduced pressure to remove the solvents.

The dried polymer was capable of being molded in a press at 154° C. repeatedly. Employing this temperature and a pressure of 1000 lbs./in.², a sheet of thickness 0.075 inch was prepared which had the following properties:

Shore A hardness (degrees) _____ 87
Tensile (lbs./in.²) _____ 5800
Elongation at break (percent) _____ 850
Modulus (lbs./in.²):
  100% _____ 900
  300% _____ 1020

The example illustrates a preferred embodiment of the present invention.

EXAMPLE 2

Following the procedure of Example 1 but substituting 2.92 parts of octane-1,4-diamine (1.02 equivalent per NCO equivalent) for the butane-1,4-diamine, there was obtained a polymer which was capable of repeated molding and had the following physical properties when molded:

Shore A hardness _____ 87
Tensile _____ 4480
Elongation _____ 820
Modulus:
  100% _____ 830
  300% _____ 930

This example also represents a preferred embodiment of the present invention and illustrates the effect of an alternative diamine.

EXAMPLE 3

To 2460 parts of 2,4-tolylene diisocyanate (14.17 moles, NCO/OH ratio 1.73/1) which was stirred at 50° C. was slowly added 9000 parts (8.19 moles, molecular weight 1100 of poly(ethylene adipate) containing 1.8 parts, 0.02% on the weight of the polyester, of adipoyl chloride stabilizer. The reaction was stirred overnight at 50–60° C. and thereafter for 1 hour at 70° C. The polymer was cooled. The final prepolymer had an isocyanate content of 4.3% and virtually no free, unreacted diisocyanate, i.e. less than about 0.5%.

A solution containing 2000 parts of the above prepolymer in 4000 parts of dry chloroform was prepared. Another solution containing 135.0 parts of a 70/30 isomeric mixture of meta/para-xylene diamines (97% of NCO equivalency of the prepolymer) and 8.8 parts of benzyl amine (4% of NCO equivalency of the prepolymer) in 4000 parts of chloroform was also prepared. The former solution was added to the latter with rapid stirring and then gel formation occurred. The product was dried to remove solvent.

EXAMPLE 4

The compositon of Example 3 was melt spun through a 0.040" orifice in the bottom of a heated cylinder at temperatures of from 165° C. to 180° C. using a nitrogen head pressure of 100 p.s.i. max. The extruded monofilament fiber was stretched at a draw down range of from 2/1 to 10/1 and spooled at from 50 to 150 ft./min. A representative fiber was tested using a Scott IP-2 tester and exhibited the following properties:

Monofilament denier—32
Modulus @ 300% elongation—0.218 gram/denier
Tenacity—0.453 gram/denier
Ultimate elongation—623%

EXAMPLE 5

Following the procedure of Example 3 polymers were prepared which contained varying amounts of benzyl amine as a molecular weight controller (terminator). The polymers were similarly melt spun and tested as in Example 4. The properties were as shown:

| Experiment | Percent Terminator [1] | Denier monofilament | 300% Modulus (g./denier) | Tenacity (g./denier) | Ultimate elongation, percent |
|---|---|---|---|---|---|
| 21 | 3.5 | 54 | 0.259 | 0.556 | 622 at 150 ft./min.[2] |
|  |  | 84 | 0.238 | 0.583 | 688 at 83 ft./min.[3] |
| 85 | 2.0 | 196 | 0.189 | 0.408 | 547.[2] |
|  |  | 167 | 0.299 | 0.581 | 577.[3] |
| 90 | 2.0 | 475 | 0.116 | 0.242 | 638.[2] |
|  |  | 463 | 0.145 | 0.456 | 744.[2] |

[1] Percent of NCO equivalency of the prepolymer.
[2] Uncured.
[3] Cured at 60° C. to 100° C. for 2 to 4 hours in a laboratory oven.

EXAMPLE 6

A prepolymer was prepared according to the process of Example 1 employing suitable quantities of poly(tetramethylene glycol) ether of molecular weight about 1100 and 2,4-tolylene diisocyanate at a ratio of 1.7 NCO per OH equivalent to obtain a prepolymer having an NCO content of 4.2%. The prepolymer obtained was essentially free of unreacted diisocyanate.

A solution containing 40 parts of the above prepolymer in 240 parts of chloroform was prepared. Another solution containing 2.66 parts of meta-xylylene-diamine (98% of NCO equivalency in the prepolymer) and 0.0877 part of diethylamine (3% of NCO equivalency in the prepolymer) in 560 parts of chloroform was also prepared. The former solution was added to the latter with stirring and then gel formation occurred. The product was dried to remove solvent. The dried product was capable of being compression molded repeatedly according to the procedure of Example 1 and when so molded exhibited the following properties:

| | |
|---|---|
| Shore hardness A | 90 |
| Tensile | 2150 |
| Elongation | 650 |
| Modulus: | |
| 50% | 950 |
| 300% | 1210 |

This example also shows a preferred embodiment of the present invention involving a polyether based prepolymer.

EXAMPLE 7

A prepolymer was prepared according to the procedure of Example 1 employing a blend of 75% of a poly(ethylene adipate) and 25% of a poly(propylene glycol)ether, both of molecular weight of about 1100, with a suitable amount of 2,4-tolylene diisocyanate at a ratio of 1.73 NCO per OH equivalency to obtain a prepolymer of NCO content equal to 4.22%. The prepolymer was essentially free of unreacted diisocyanate.

A solution of 400 parts of the above prepolymer was prepared in 800 parts of chloroform. Another solution containing 27.0 parts of a 70/30 isomeric mixture of meta- to para-xylenediamines (98.5% of NCO equivalency of the prepolymer) and 1.075 parts of benzylamine (2.5% of NCO equivalency of the prepolymer) in 200 parts of chloroform was also prepared. The former solution was added to the latter with stirring and gel formation occurred after several minutes of stirring. The product was dried to remove the solvent. The dried product was capable of being compression molded repeatedly according to the procedure of Example 1 and when so molded exhibited the following properties:

| | |
|---|---|
| Shore hardness A | 92 |
| Tensile | 4100 |
| Elongation | 810 |
| Modulus: | |
| 50% | 870 |
| 300% | 1085 |

This example represents another embodiment of the present invention wherein a mixture of polyester and polyether is used to prepare the prepolymer.

We claim:

1. An essentially linear thermoplastic polyurethane-urea having a melt-flow temperature in the range of 100–180° C. and being capable of repeated shaping, comprising a plurality of

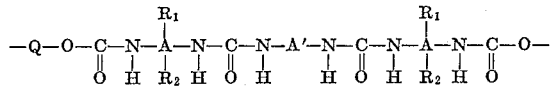

units, said polyurethane-urea being porduced by reacting an amine of which at least 90% is a diamine of the formula $$H_2N\text{---}CH_2\text{---}(A'')_n\text{---}CH_2\text{---}NH_2$$

with an isocyanate-terminated prepolymer containing less than about 1% free diisocyanate, produced by reacting a hydroxyl-terminated polyester or polyether of molecular weight of about 500 to about 5,000 and having the formula $$HO\text{---}Q\text{---}OH$$

with an isocyanate of which at least 90% is a diisocyanate of the structure

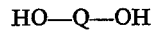

wherein the reactivity of one isocyanate group toward the hydroxyl group of said polyester or polyether is at least five times the reactivity of the other isocyanate group, the ratio of equivalents of diisocyanate to free hydroxyl groups of the polyester being within the range of about 1.3 to 1 and 1.9 to 1 and the reaction being carried out at a temperature between about 30° C. and 100° C. until a linear polymer containing less than about 1% of residual diisocyante is obtained, and the amount of said diamine being from about 1.005 to about 1.1 equivalents per equivalent of isocyanate, wherein:

Q is the residue on removal of the terminal hydroxyl groups from said polyester or polyether;

A is an aromatic ring;

$R_1$ and $R_2$ are hydrogen, alkyl of 1–6 carbon atoms, chloro or methoxy, provided at least one of $R_1$ and $R_2$ is other than hydrogen; and $A_2$ is $\text{---}CH_2\text{---}(A'')_n\text{---}CH_2\text{---}$ where A″ is alkylene of up to about 10 carbon atoms or a monocarbicylic ring and $n$ is 0 or 1.

2. A thermoplastic polyurethane-urea composition according to claim 1 wherein A′ is the residue on removal of the $NH_2$ groups from $$N_2H\text{---}CH_2\text{---}(A'')n\text{---}CH_2\text{---}NH_2$$

where A″ is alkylene of up to about 10 carbon atoms or phenylene and $n$ is 0 or 1.

3. A thermoplastic polyurethane-ureau compositions according to claim 1 wherein the $\text{---}(R_1)A(R_2)\text{---}$ radical is a 2,4-tolylene group.

4. A thermoplastic polyurethane-urea composition according to claim 1 wherein the $\text{---}(R_1)A(R_2)\text{---}$ radical is a 2,4-tolylene group and A′ is the residue on removal of the $NH_2$-groups from $$H_2N\text{---}CH_2\text{---}(A'')n\text{---}CH_2\text{---}NH_2$$

where A″ is alkylene of up to about 10 carbon atoms or phenylene and $n$ is 0 or 1.

5. A thermoplastic polyurethane-urea composition according to claim 4 wherein the A′ radical is a xylylene group.

6. A thermoplastic polyurethane-urea composition according to claim 1 wherein the Q polyester residue represents the residue from a hydroxyl terminated poly-(ethylene adipate).

7. A thermoplastic polyurethane-urea composition as described in claim 1 wherein the polyester residue represented by Q is the residue from hydroxyl terminated poly(ethylene adipate) polyester, the $\text{---}(R_1)A(R_2)\text{---}$ radical is the 2,4-tolylene group, and the A′ radical is a xylylene group.

8. A shaped article produced by compressing the polyurethane-urea of claim 1.

9. An elastic fiber produced by melt spinning the polyurethane urea of claim 1.

References Cited

UNITED STATES PATENTS

| | | | |
|---|---|---|---|
| 2,929,800 | 3/1960 | Hill | 260—77.5 |
| 3,087,912 | 4/1963 | Wagner et al. | 260—67 |
| 3,148,173 | 9/1964 | Axelrood | 260—75 |
| 3,361,844 | 1/1968 | Hoeschele | 260—858 |
| 3,379,683 | 4/1968 | Booth | 260—47 |
| 3,384,624 | 5/1968 | Heiss | 260—77.5 |
| 3,383,365 | 5/1968 | Tate et al. | 260—75 |
| 3,401,133 | 9/1968 | Grace et al. | 260—29.2 |

OTHER REFERENCES

Saunders et al. Polyurethanes, vol. 1, Interscience New York (1962) pp. 150–161.

DONALD E. CZAJA, Primary Examiner

H. S. COCKERAM, Assistant Examiner

U.S. Cl. X.R.

260—77.5